(12) United States Patent
Ohya et al.

(10) Patent No.: US 6,565,962 B2
(45) Date of Patent: May 20, 2003

(54) POLYIMIDE POROUS FILM

(75) Inventors: Shyusei Ohya, Ichihara (JP); Yuuichi Fujii, Ichihara (JP); Shigeru Yao, Ichihara (JP); Yukihiko Asano, Ichihara (JP); Kimio Nakayama, Ichihara (JP); Kenji Fukunaga, Ichihara (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 10/201,351

(22) Filed: Jul. 22, 2002

(65) Prior Publication Data

US 2003/0018094 A1 Jan. 23, 2003

(30) Foreign Application Priority Data

| Jul. 23, 2001 | (JP) | 2001-221268 |
|---|---|---|
| Aug. 29, 2001 | (JP) | 2001-260148 |
| Oct. 18, 2001 | (JP) | 2001-320374 |
| Nov. 1, 2001 | (JP) | 2001-336239 |
| Nov. 29, 2001 | (JP) | 2001-364527 |

(51) Int. Cl.$^7$ .............. B32B 3/00; C08J 9/28; B01D 39/00
(52) U.S. Cl. .............. 428/315.5; 210/500.39; 264/41; 428/318.4; 428/318.6; 428/318.8; 521/64; 521/183; 521/184
(58) Field of Search ............... 428/315.5, 318.4, 428/318.6, 318.8; 521/183, 184, 64; 210/500.39; 264/41

(56) References Cited

FOREIGN PATENT DOCUMENTS

| JP | 11310658 A | 11/1999 |
|---|---|---|
| JP | 2001145826 A | 5/2001 |

*Primary Examiner*—Morton Foelak
(74) *Attorney, Agent, or Firm*—Schnader Harrison Segal & Lewis LLP

(57) ABSTRACT

A polyimide porous film obtained by drying and imidizing a polyimide precursor porous film which is substantially homogeneous on both sides, the polyimide porous film having pores on both sides wherein the pores all satisfy the conditions: 1) the difference in the mean pore size of both sides is less than 200% based on the smaller average value of the mean pore size, 2) the coefficient of variation for the pore size on each side is smaller than 70%, 3) the coefficient of variation for the pore centroid distance on each side is smaller than 50%, and 4) the mean pore size on each side is 0.05–5 μm.

6 Claims, 4 Drawing Sheets

POLYIMIDE POROUS FILM

BACKGROUND OF THE INVENTION

1. Field of the Invention

The present invention relates to a polyimide porous film with a uniform pore diameter and a uniform interpore distance.

2. Description of the Related Art

As a process for the production of porous polyimide films, T. Takeichi et al. describe in High Performance Polymers, Vol. 11, p. 1 (1999) a process for obtaining a polyimide porous film by synthesizing a polyurethane-imide and then heat treating the urethane segment at 300–400° C. for decomposition.

In Polymer 36, 1325, 1995 and Polymer 37, 5229, 1996 there is disclosed a process for obtaining porous polyimides by incorporating a readily decomposable α-methylstyrene segment into a polyimide block copolymer or graft copolymer and heat treating the non-polyimide segment for its decomposition.

The present inventors have already invented a porous film possessing throughholes in the film cross-section and having no dense layer on the surface, as disclosed in Japanese Unexamined Patent Publication No. 11-310658. The production process for the porous film accomplishes deposition of a polyimide precursor porous film with throughholes by casting a polyimide precursor solution on a substrate and contacting it with a coagulating solvent via a solvent substitution rate-controlling material.

Japanese Unexamined Patent Publication No. 2001-145826, also by the present inventors, discloses a process for production of a polyimide porous film characterized by employing, as the dope, a mixed solution of a good solvent and a poor solvent for the polyimide precursor.

Polyimide porous films are desired which can be produced cheaply and in a simpler manner without using solvent substitution rate-controlling materials.

When the polyimide precursor dope is cast onto the substrate in the process mentioned above, a difference exists in the conditions of one side of the cast liquid film which is solid, on the substrate side contacting with the substrate, and the other side which is in direct contact with the coagulating solution on the air side opposite it, such that when a porous film is formed by immersion in a coagulating solution, the pore diameters and pore positions are not the same on both sides. This often causes inconveniences in terms of the liquid permeability and gas permeability when the film is used as a battery separator or micro-filter.

Consequently, a process for production of a polyimide porous film with a uniform quality has been ardently desired.

BRIEF SUMMARY OF THE INVENTION

It is an object of the present invention to provide a polyimide porous film with approximately uniform pore sizes and interpore distances.

Specifically, the invention relates to a polyimide porous film obtained by drying and imidizing a polyimide precursor porous film which is substantially homogeneous on both sides, the polyimide porous film having pores on both sides wherein the pores all satisfy the following conditions 1) to 4):

1) The difference in the mean pore size of both sides is less than 200% based on the smaller average value of the mean pore size.

2) The coefficient of variation for the pore size on each side is smaller than 70%.

3) The coefficient of variation for the pore centroid distance on each side is smaller than 50%.

4) The mean pore size on each side is 0.05–5 μm.

DETAILED DESCRIPTION OF THE INVENTION

Figure 1:
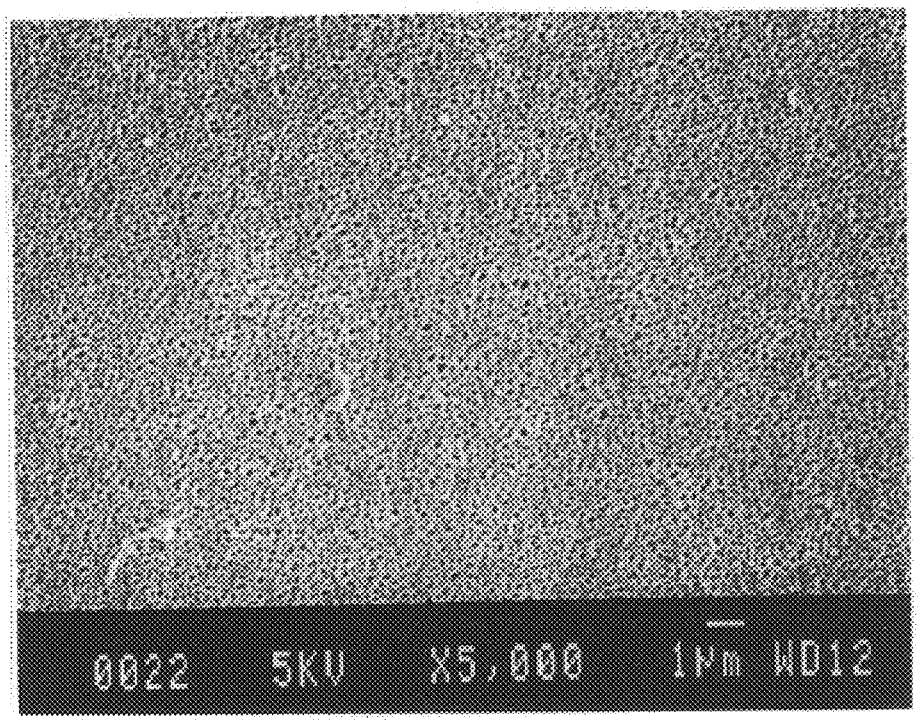
FIG. 1 is an electron microscope photograph showing the surface of the air side of the polyimide porous film obtained in Example 1 of the invention.

The aforementioned polyimide precursor porous film is obtained as a precursor film which is substantially homogeneous on both sides by, for example, a method (first method) in which a polyimide precursor dope solution is cast and immersed in a coagulating solution to obtain a polyimide precursor porous film, wherein the following conditions for the composition of the dope solution and coagulating solution are satisfied:

(1) The polyimide precursor dope solution comprises 0.2–30 wt % of a polyimide precursor and 99.8–70 wt % of a mixture of a solvent and a non-solvent therefor.

(2) The mixed solvent of the dope solution comprises, of 100 wt %, 50–90 wt % of the solvent and 50–10 wt % of the non-solvent.

(3) The coagulating solution comprises 50–90 wt % of the non-solvent and 50–10 wt % of the non-solvent for the polyimide precursor, as a total of 100 wt %.

(4) The compositional ratio of the solvent in the dope solution is greater than the compositional ratio of the solvent in the coagulating solution.

More preferably, the porous film is obtained as a precursor film which is substantially homogeneous on both sides by a method (second method) in which the aforementioned polyimide precursor porous film is obtained by casting the polyimide precursor dope onto the substrate, forming on the liquid film a protective layer comprising a mixture of a solvent and a non-solvent at 30–70 wt % of the non-solvent and 70–30 wt % of the solvent for the polyimide precursor (total: 100 wt %) and then immersing it in a coagulating solution.

The polyimide precursor dope solution preferably comprises 50–90 wt % of the polyimide precursor solvent and 50–10 wt % of its non-solvent for a total of 100 wt %.

The polyimide precursor solution also preferably comprises 0.2–30 wt % of the polyimide precursor and 99.870 wt % of the organic solvent for a total of 100 wt %.

The aforementioned polyimide precursor is a polyamic acid obtained by polymerizing a tetracarboxylic acid component and a diamine component, preferably aromatic, or its partially imidized product, and it may be subjected to heat treatment or chemical imidization for ring closure to obtain a polyimide resin. A polyimide resin is a heat-resistant polymer with an imidization rate of at least 50%.

The tetracarboxylic acid component and the diamine component are dissolved in roughly equimolar amounts in the aforementioned organic solvent and polymerized, to give a polyimide precursor with an inherent viscosity (30° C., concentration: 0.5 g/100 mL, NMP) of 0.3 or greater and preferably 0.5–7, especially 0.7–7.0 and most preferably 2.2–7. When the polymerization is conducted at about 80° C. or higher, a partially ring-closed imidized polyimide precursor is produced.

Preferred as aromatic diamine components are, for example, aromatic diamine compounds represented by the general formula (1):

$$H_2N-Ar(R_1)_m-[A-Ar(R_1)_m]_n-NH_2 \quad (1)$$

wherein Ar is an aromatic ring, $R_1$ or $R_2$ is hydrogen or a substituent such as lower alkyl or lower alkoxy, A is a direct bond or a divalent group such as O, S, Co, $SO_2$, SO, $CH_2$ or $C(CH_3)_2$, m is 0 or an integer of 1–4 and n is 0or an integer of 1–3.

As specific compounds there may be mentioned 4,4'-diaminodiphenyl ether (hereinafter abbreviated as "DADE"), 1,4-phenylenediamine (hereinafter abbreviated as "PPDA"), 3,3'-dimethyl-4,4'-diaminodiphenyl ether and 3,3'-diethoxy-4,4'-diaminodiphenyl ether.

The diamine component may instead be a diaminopyridine represented by general formula (2):

$$H_2N-(Py)-NH_2 \quad (2)$$

and specifically there may be mentioned 2,6-diaminopyridine, 3,6-diaminopyridine, 2,5-diaminopyridine and 3,4-diaminopyridine.

The tetracarboxylic acid component is preferably 3,3',4,4'-biphenyltetracarboxylic dianhydride (hereinafter abbreviated as "S-BPDA") or 2,3,3',4'-biphenyltetracarboxylic dianhydride (hereinafter abbreviated as "a-BPDA"), but it may instead be 2,3,3',4'- or 3,3',4,4'-biphenyltetracarboxylic acid or a 2,3,3',4'- or 3,3',4,4'-biphenyltetracarboxylic acid salt or esterified derivative. The biphenyltetracarboxylic acid component may also be a mixture of any of the aforementioned biphenyltetracarboxylic acid compounds.

The tetracarboxylic acid component may also contain, in addition to the aforementioned biphenyltetracarboxylic acid compounds, tetracarboxylic acids such as pyromellitic acid, 3,3',4,4'-benzophenonetetracarboxylic acid, 2,2-bis(3,4-dicarboxyphenyl)propane, bis(3,4-dicarboxyphenyl)sulfone, bis(3,4-dicarboxyphenyl)ether, bis(3,4-dicarboxyphenyl)thioether, butanetetracarboxylic acid or their anhydrides, salts or esterified derivatives, at a proportion of up to 100 mole percent and especially no greater than 10 mole percent with respect to the total tetracarboxylic component.

The solvent of the polyimide precursor solution is a polar organic solvent, examples of which include N-methylpyrrolidone (NMP), p-chlorophenol (PCP), pyridine, N,N-dimethylacetamide (DMAc), N,N-dimethylformamide (DMF), dimethylsulfoxide (DMSO), tetramethylurea, phenol, cresol and the like. Particularly preferred among these are NMP, DMAc and DMSO.

The non-solvent for the polyimide precursor may be an aliphatic alcohol, ketone, ether, ester, water or the like, but aliphatic alcohols are particularly preferred. Especially preferred are aliphatic alcohols of 3–8carbons. These are preferred because of their excellent miscibility with polar organic solvents for the polyimide precursor. Specifically there are preferred 1-propanol, 2-propanol, 1-butanol, 2-butanol, 2-methyl-1-propanol, tert-butanol and the like. Using an alcohol of no more than 2 carbons, i.e. methanol or ethanol, as the non-solvent may be inconvenient as the polyimide precursor solution immediately precipitates the polymer, often preventing formation of a homogeneous film.

Polyhydroxy alcohols are suitable as the non-solvent for the polyimide precursor, with aliphatic polyhydroxy alcohols being particularly preferred. Specifically there may be mentioned alkylene glycols, preferably ethylene glycol, glycerin and polyalkylene glycols and their derivatives, and especially polyethylene glycol with a molecular weight of up to 600.

The polyimide precursor dope solution comprises 0.2–30 wt % of a polyimide precursor and 99.8–70 wt % of a mixture of a solvent and a non-solvent therefor, and more preferably it comprises 1–20 wt % of the polyimide precursor. The polyimide precursor concentration is preferably not less than 0.2 wt % because this reduces the film strength. The polyimide precursor concentration is also preferably not greater than 30 wt % because this makes it difficult to obtain a homogeneous polymer solution.

The dope solution contains a mixed solvent comprising a polyimide precursor and a solvent and non-solvent for the polyimide precursor, wherein the mixed solvent comprises 50–90 wt % of the solvent and 50–10 wt % of the non-solvent, and preferably it comprises 50–70 wt % and especially 50–65 wt % of the solvent and 50–30 wt % and especially 50–35 wt % of the non-solvent (for a total of 100 wt %). If the mixed solvent comprises less than 50 wt % of the solvent, the polyimide precursor tends to precipitate, while if it comprises more than 90 wt % of the solvent, a homogeneous porous film cannot be obtained.

The dope solution is obtained by adding a non-solvent for the polyimide precursor to a solution of the polyimide precursor in the solvent, and maintaining the composition in a dissolved state in which the polyimide precursor does not precipitate. Precipitation in the solution is judged by visual examination of transparency or semi-transparency. The composition of the dope has the proportion of solvent and non-solvent specified above, and is a solution with a long shelf-life.

The method of casting the polyimide precursor solution to obtain a cast solution film is not particularly restricted, and there may be employed a method of casting the polyimide precursor solution onto a substrate such as a glass plate, metal plate or the like serving as the substrate or onto a moving belt, either by spraying or with a doctor blade, or a method of extruding the polyimide precursor solution from a T-die. Alternatively, coating or spin casting may be employed.

The casting dope solution may also contain surfactants, flame retardants, coloring agents or reinforcing agents such as glass fiber, silicon fiber or carbon fiber. Such additives and reinforcing agents may be added to the polyimide precursor polymerization solution or to the casting dope solution.

According to the first method, the dope solution is immersed in a coagulating solution containing 50–90 wt % of a non-solvent and 50–10 wt % of a solvent for the polyimide precursor (total: 100 wt %) (provided that the compositional ratio of the solvent in the dope solution is larger than the compositional ratio of the solvent in the coagulating solution), to obtain a homogeneous polyimide porous film.

According to the second method, a protective layer comprising a mixture of a polar solvent and a non-solvent is formed on the cast liquid film, which is then immersed in the coagulating solution to obtain a homogeneous polyimide porous film.

The protective layer performs the role as a buffer layer for solvent exchange between the liquid film and coagulating solution so that the polyimide precursor does not dissolve or precipitate, and to slow the phase transition for the formation of a homogeneous porous film.

The protective layer comprises the non-solvent in a proportion from −40 to +10 wt % and especially from −10 to +10 wt %, based on the composition of the mixed solution with the polyimide precursor at the precipitation limit. The non-solvent proportion is preferably larger than the precipitation limit, because otherwise the film to be precipitated tends to redissolve. However, the non-solvent is preferably not more than 10 wt % greater than the precipitation limit composition because the film surface pores become plugged, preventing formation of a homogeneous porous film. The limiting-concentration may be determined in the following manner. The non-solvent is added to polyimide precursor solutions with different concentrations, and the amount of non-solvent added during phase separation of the polyimide precursor is plotted against the polyimide precursor solution concentration, tracing a boundary line above which is the region of separation into two phases and below which is the monophase region. The limit composition for the solvent and non-solvent is determined from the value of the intercept obtained by extrapolating the boundary line to a polyimide precursor concentration of zero.

For example, with a polyimide precursor comprising BPDA and PPDA, the precipitation limit composition where the non-solvents are 1-propanol and 2-propanol and the solvent is NMP will be 40 wt % propanol, 60 wt % NMP. Similarly, when the solvent is DMAc, the composition will be 34 wt % propanol, 66 wt % DMAc. When the solvent is DMAc and the non-solvent is ethylene glycol, the precipitation limit composition will be 64 wt % of the non-solvent and 36 wt % of the solvent.

The composition of the protective layer is preferably 30–70 wt % of the non-solvent and 70–30 wt % of the polar solvent, for a total of 100 wt %, based on the precipitation limit composition.

The proportion of the non-solvent in the mixed solvent of the protective layer is preferably not larger than 70 wt % because the film surface pores become plugged, preventing formation of a homogeneous porous film. The non-solvent proportion is also preferably not less than 30 wt % because the porous film surface redissolves, often causing blocking of the surface pores.

The thickness of the protective layer is not particularly restricted but is preferably 5–300 µm.

The method of casting the protective film may be selected from among coating, spraying and spin casting methods. The casting apparatus may be selected from among glass rods, doctor blades and T-die extruders.

The liquid film with the protective layer formed thereon is preferably immersed in the coagulating solution after standing for a period from 10 seconds to 10 minutes. During this time, the protective layer-cast liquid film and coagulating solution are preferably kept at a temperature of from −20° C. to about 30° C. They are more preferably kept at −20° C. to 5° C. At a temperature of below about 30° C., a protective layer will depress the solvent-exchange rate so that the separation speed is slow, providing an excellent effect as a buffer layer.

According to the first and second methods, the coagulating solution is preferably a mixed solution comprising 50–90 wt % of the non-solvent and 50–10 wt % of the solvent for the polyimide precursor, for a total of 100 wt %. More preferably, it comprises 55–90 wt % of the non-solvent and 45–10 wt % of the solvent. If the non-solvent proportion is less than 50 wt %, a long time is required for production of a solid film, and the resulting film will have low dimensional stability. If the non-solvent proportion is greater than 90 wt %, solvent exchange with the protective layer solution or liquid film solution causes the film formation to occur too rapidly, making it impossible to achieve formation of a homogeneous porous film. However, the compositional ratio of the non-solvent in the coagulating solution is preferably larger than the compositional ratio of the non-solvent in the protective layer. If it is smaller than the compositional ratio of the non-solvent in the protective layer, the polyimide precursor will redissolve. The coagulating solution having this composition will be closer to the composition of the polyimide precursor dope or protective layer solution and, therefore, the coagulating reaction will occur slowly such that the phase separation will proceed at a very slow rate; consequently, a homogeneous porous film will be formed not only on the surface, but also to the sections deeper than the surface and even to the surface of the substrate.

The resulting polyimide precursor porous film is preferably washed with the non-solvent to fix the structure. The sections adhering to or swollen on the film are washed with the non-solvent for the polyimide precursor, thereby fixing the formed structure. The non-solvent used may be the same aliphatic alcohol component as in the coagulating solution, or an aliphatic ketone or aliphatic alcohol of up to 3 carbons, water, or the like.

The thickness of the polyimide precursor porous film is preferably 5–300 µm, more preferably 5–200 µm and especially 5–100 µm. If the thickness is smaller than 5 µm, the mechanical strength is reduced and handling becomes difficult in the subsequent steps. If the thickness is larger than 300 µm, the film becomes solid before the solvent and non-solvent have sufficiently permeated, often resulting in small pores or non-opened pores, and non-uniform pore sizes.

The washed polyimide precursor film is stretched onto a pin tenter or the like. The stretched concentration of the polyimide precursor film is adjusted to avoid breakage by heat contraction during heating, and is then immediately dried and imidized. After continuous or non-continuous drying at a temperature of 50–100° C. with a hot-air drier, hot air furnace or the like, the temperature is increased further to allow imidization. The imidization may be heat imidization or chemical imidization. Chemical imidization employs an aliphatic acid anhydride or aromatic acid anhydride as a dehydrating agent, and a tertiary amine such as triethylamine as the catalyst for imidization. There may also be used an imidazole, benzimidazole or substituted derivative thereof, as in Japanese Unexamined Patent Publication No. 4-339835.

For heat imidization, the dried polyimide precursor is preferably subjected to heat imidization at an increased temperature of 280–500° C. The temperature increase may be carried out in stages, or heating to the prescribed temperature may be carried out at one time. A temperature of 280–500° C. may be maintained for 0.5–240 minutes, preferably 5–240 minutes in air, or preferably in an inert atmosphere. The temperature is then lowered to room temperature to obtain the polyimide precursor film.

Figure 7:
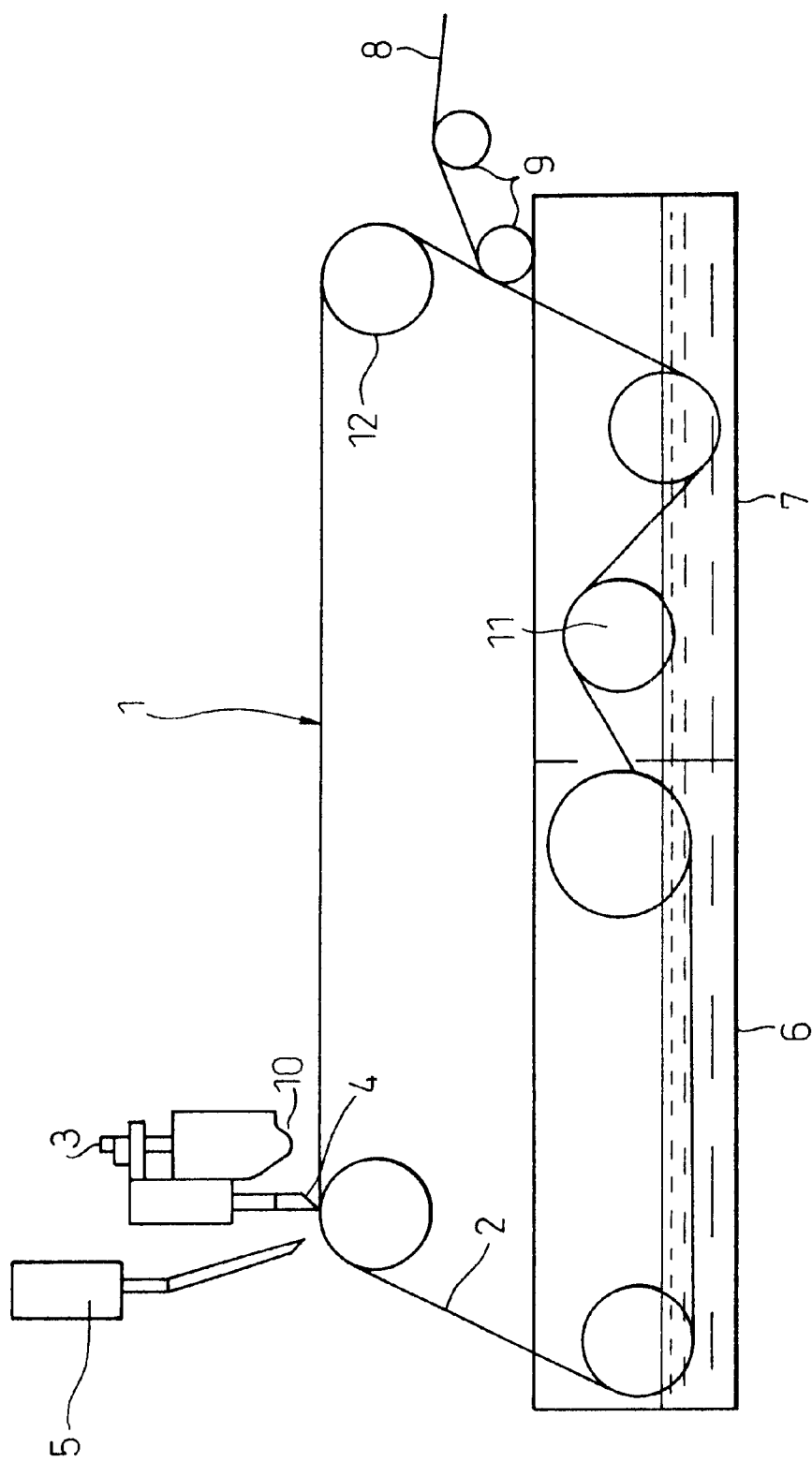
FIG. 7 is a schematic illustration of a working embodiment of a continuous production apparatus for a porous polyimide film of the invention, according to the second method. In this drawing, 1 is a continuous production apparatus, 2 is a belt conveyor or casting drum, 3 is a polymer solution supply port, 4 is a film thickness adjustor, 5 is a liquid protective layer supply port, 6 is a coagulating solution bath, 7 is a structure-stabilizing solvent bath, 8 is a porous polymer film, 9 is a take-up roll, 10 is a nozzle or T-die, 11 is a rubber roll and 12 is a driving roll.

For continuous application of the second method, an apparatus as shown in FIG. 7 is used for a continuous polyimide porous film production process comprising a step of supplying the polymer solution with a solution viscosity of 10–30,000 onto preferably a belt conveyor or cast drum to form a polymer solution cast film with a uniform film thickness; a step of using a spray system, nozzle system or coating roll system for continuous supply of a liquid protective layer of the aforementioned composition comprising a solvent for the polymer and a solution which is a non-solvent for the polymer and is miscible with the solvent used in the polymer solution, onto the polymer solution cast film; a step of immersing the laminate comprising the formed polymer solution cast film and the liquid protective layer into a coagulating solution of the aforementioned composition containing a non-solvent for the polymer and conveying it through the coagulating solution to precipitate the porous polymer film and elute out the liquid protective layer; a step of eluting out the residual portion of the liquid protective layer to stabilize the porous film structure; a step of releasing the resulting polyimide precursor porous film which is approximately homogeneous on both sides from the belt conveyor or cast drum; and a step of subjecting the released polyimide precursor porous film to drying and/or heat treatment or stretching.

According to the invention there is obtained an approximately homogeneous porous film with minimal difference in pore size between both sides, and wherein 1) the difference in the mean pore size on the air side and the substrate side is smaller than 200% of the smaller average mean pore size value.

The mean pore size is the average numerical value of the pore diameters as viewed from the respective surfaces of the air side and the substrate side. The difference in the pore sizes on the air side and the substrate side must be such that the proportion of the difference between both mean pore values is smaller than 200% and preferably smaller than 150%, based on the value for the side with the smaller pore size. If it is larger than 200%, the pore sizes of both sides differ to an extent that the difference in the pore sizes of both sides becomes significant when the film is used as a battery separator or filter, causing inconvenience due to differences in liquid permeability and gas permeability.

There is also obtained a homogeneous porous film with approximately uniform pore sizes on both sides, and wherein 2) the coefficient of variation for the pore size on the air side and the substrate side is smaller than 70%. The coefficient of variation (CV) of the pore size distribution is represented by the ratio of the standard deviation ($\sigma$) with respect to the numerical average ($Xn$) from each pore value ($Xi$) as measured in the manner described above, and it is calculated by the following equation.

$$CV(\%) = (\sigma/Xn) \times 100$$

The coefficient of variation for the pore size distribution may be used as a measure of the uniformity of the pore sizes, and the coefficient of variation in the pore sizes is preferably no greater than 60%. If the coefficient of variation in the pore sizes is greater than 70%, the variability of the pore sizes increases such that when the film is used in a filter or the like, the uniformity of filtration performance is impaired.

There is also obtained an approximately homogeneous porous film with uniform interpore distances on both sides, and wherein 3) the coefficient of variation for the pore centroid distance on the air side and the substrate side is smaller than 50%.

The centroid distance (li) is the distance from the centroid of one pore to the centroid of an adjacent pore, and it may be used as a measure of the uniformity of positioning of the pores. If the coefficient of variation for the pore centroid difference is greater than 50%, the pore positions become dispersed, such that sections of uneven pressure are produced when the film is used in a filter or separator, and in some cases the porous film may suffer damage. The coefficient of variation for the pore centroid distance is more preferably smaller than 45%. The value may be determined by replacing the pore size value in the equation above with the value for the pore centroid distance.

Pore sizes within a narrow range may be obtained on both sides. That is, the mean pore size is 0.05–5 μm on both the air side (side A) and the substrate side (side B). It is more preferably 0.08–3 μm. If the mean pore size is too small, using the film in a filter, for example, results in a poor filtration rate. If it is greater than 5 μm, the collecting efficiency is impaired, and therefore the range given above is preferred.

According to the invention, therefore, it is possible to obtain a homogeneous polyimide porous film wherein the porosity is 20–80% and the mean pore size is 0.05–5 μm, while the difference in the mean pore sizes of the air side (side A) and the substrate side (side B) is smaller than 200% based on the smaller one, the coefficient of variation of the pore sizes on both sides is smaller than 70%, and the coefficient of variation for the pore centroid distance is smaller than 50%, although differences must be allowed for in different production conditions.

The polyimide porous film may be used as one layer or as a combination of two or more layers. Using a combination of two or more layers provides reinforcement or greater thickness, depending on the purpose. Other materials such as other polymer films, fibers, inorganic substances and the like may also be used in combination therewith.

The present invention will now be explained in greater detail by way of examples, with the understanding that the invention is in no way limited thereby. The tests and evaluation methods in the examples and comparative examples were as follows.

Porosity

The thickness and weight of the porous film cut to a prescribed size were measured, and the porosity was calculated from the basis weight according to the following equation. Here, S is the area of the porous film, d is the film thickness, W is the measured weight and D is the polyimide density. A polyimide density of 1.34 g/cm$^3$ was used.

$$Porosity\ (\%) = 100 - 100 \times (W/D)/(S \times d)$$

Gas Permeability

Measured according to JIS P8117. The gas permeability was represented by the Gurley value.

Mean Pore Size and Coefficient of Variation

The pores on the film surface were observed with a scanning electron microscope. The long and short diameters of the pores were measured, the areas were determined, and the circle-equivalent diameters were calculated. The numerical mean pore sizes for at least 100 pores were measured, and the coefficient of variation was calculated. Measurement was made on both the air side (side A) and the substrate side (side B).

Mean Centroid Distance and Coefficient of Variation

The centroid distances between 100 arbitrarily selected pores on the film surface and their most adjacent pores were measured from a scanning electron microscope photograph. The mean centroid distance and its coefficient of variation were calculated. Measurement was made on both side A and side B.

Penetration Strength

A sample was attached to a round holder with a diameter of 11.28 mm and an area of 1 cm$^2$, and a needle with a tip shape of 0.5 R and a diameter of 1 mm$\phi$ was lowered at a speed of 2 mm/sec to penetration, at which time the penetration load was measured.

Smoothness

The smoothness of the porous film was visually evaluated in a qualitative manner.

○: Smooth surface. Δ: Slightly rough surface. X: Considerable Roughness.

EXAMPLE 1

PPDA and s-BPDA were dissolved in NMP at a PPDA molar ratio of 0.994 with respect to s-BPDA and a total monomer component weight of 19 wt %, and polymerization was carried out for 6 hours at a temperature of 40° C. to obtain a polyimide precursor solution.

1-Butanol was added to the polyimide precursor solution to prepare a solution wherein the polyimide precursor content was 14 wt %, the mixed solvent content was 86 wt %, the NMP content of the mixed solution was 66.3 wt % (57 wt % in the dope solution) and the 1-butanol content thereof was 33.7 wt % (29 wt % in the dope solution), and the dope solution was cast onto a glass plate to a thickness of about 150 μm and then immersed for 15 minutes in a coagulating solution kept at room temperature containing 66.7 wt % of 1-butanol and 33.3 wt % of NMP to obtain a polyimide precursor film which was homogeneous on both sides.

It was then washed with methanol and then water, and dried at a temperature of 100° C. to obtain a polyimide precursor porous film. The polyimide precursor film was immediately removed from the glass plate and stretched on a pin tenter, and then placed in a hot air drier at a temperature of 400° C. for 40 minutes of heat imidization. A polyimide porous film was thus obtained.

Figure 2:
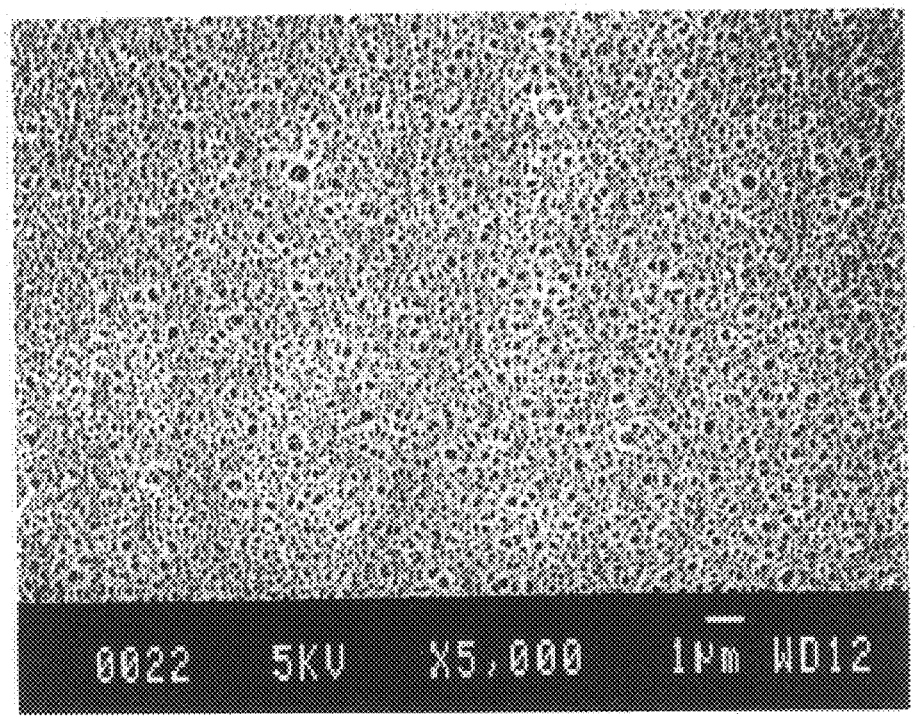
FIG. 2 is an electron microscope photograph showing the surface of the substrate side of the polyimide porous film obtained in Example 1 of the invention.

The polyimide porous film thickness was 50 μm and the porosity was 65%. As a result of observation with a scanning electron microscope, the air side had a mean pore size of 0.09 μm and a coefficient of variation of 38.6%, and the substrate side had a mean pore size of 0.18 μm and a coefficient of variation of 52.1%. The air side had a pore mean centroid distance of 0.33 μm and a coefficient of variation of 36.9%, while the substrate side had a pore mean centroid distance of 0.36 μm and a coefficient of variation of 25.0%. The difference in the mean pore sizes of the air side and the substrate side was 100% based on the value for the air side. Both sides exhibited smooth, homogeneous porous films. Scanning electron microscope photographs of the air side and the substrate side of the film are shown in FIGS. 1 and 2.

COMPARATIVE EXAMPLE 1

A polyimide porous film was obtained in the same manner as Example 1 except that the coagulating solution had a 1-butanol content of 100 wt %. The film thickness was 51 μm, the porosity was 71%, the mean pore size on the air side was 0.06 μm and the mean pore size on the substrate side was 0.53 μm.

Figure 3:
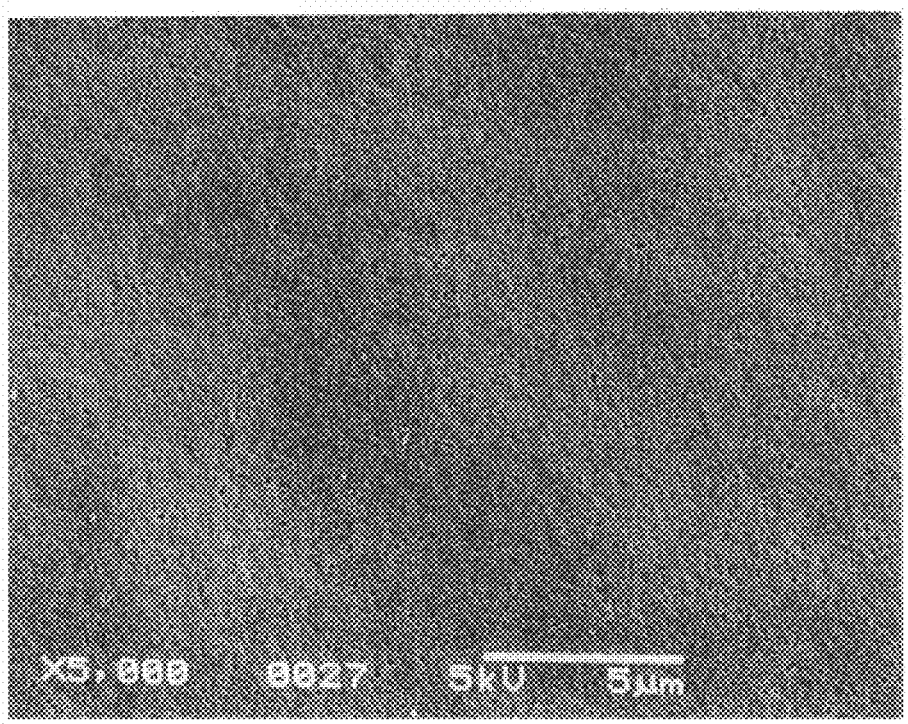
FIG. 3 is an electron microscope photograph showing the surface of the air side of the polyimide porous film obtained in Comparative Example 1.
Figure 4:
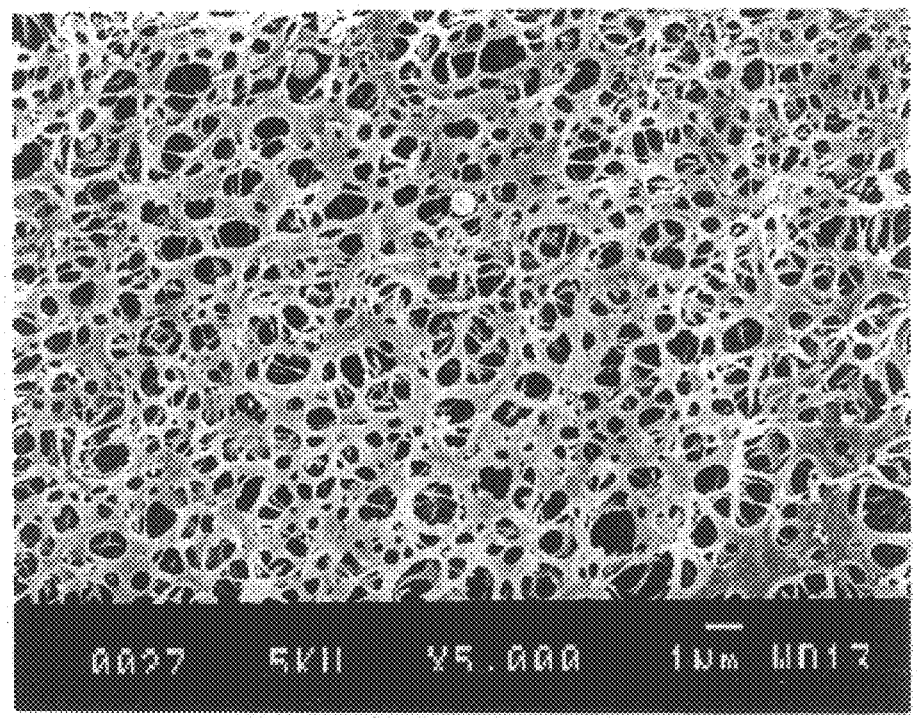
FIG. 4 is an electron microscope photograph showing the surface of the substrate side of the polyimide porous film obtained in Comparative Example 1.

The pore sizes on the air side and the substrate side differed by a significant 798% based on the air side pore size. Scanning electron microscope photographs of the air side and the substrate side of the film are shown in FIGS. 3 and 4.

EXAMPLE 2

PPDA and s-BPDA were dissolved in NMP at a PPDA molar ratio of 0.994 with respect to s-BPDA and a total monomer component weight of 8 wt %, and polymerization was carried out for 6 hours at a temperature of 40° C. to obtain a polyimide precursor solution.

The non-solvent 1-propanol was gradually added thereto while stirring to a content of 38.3 wt % with respect to 61.7 wt % of the NMP solvent in the polyimide precursor solution to prepare a dope solution. The dope solution had a polyimide precursor content of 4.9 wt % and a mixed solvent content of 95.1 wt %.

The polyimide precursor dope solution was cast onto a glass plate to a thickness of 30 μm using a doctor blade. It was then immersed in a coagulating solution prepared to 80 wt % of 1-propanol as the non-solvent for the polyimide precursor and 20 wt % of NMP as the solvent. Upon immersion, the liquid film became cloudy by 1–2 seconds, forming a solid film. The rest of the procedure was carried out in the same manner as Example 1 to obtain a polyimide porous film.

The polyimide porous film thickness was 13 μm and the porosity was 51%. As a result of observation with a scanning electron microscope, the air side had a mean pore size of 0.48μm and a coefficient of variation of 32.7%, and the substrate side had a mean pore size of 0.76 μm and a coefficient of variation of 58.3%. The air side had a pore mean centroid distance of 0.53 μm and a coefficient of variation of 24.6%, while the substrate side had a pore mean centroid distance of 0.90 μm and a coefficient of variation of 39.8%. The difference in the mean pore sizes of the air side and the substrate side was 58% based on the value for the air side. Both sides exhibited smooth, homogeneous porous films.

EXAMPLE 3

A polyimide porous film was obtained in the same manner as Example 2, except that DADE was used as the diamine component and 2-propanol was used as the non-solvent, the dope solution had a polyimide precursor content of 6.3 wt % and a mixed solvent content of 93.7 wt %, the dope mixed solvent had a composition with 62.5 wt % of the solvent and 37.5 wt % of the non-solvent, and the coagulating solution contained 66.7 wt % of the non-solvent and 33.3 wt % of the solvent.

The polyimide porous film thickness was 15 μ, the porosity was 41%, the air side had a mean pore size of 0.73 μm and a coefficient of variation of 35.3%, and the substrate side had a mean pore size of 1.33 μm and a coefficient of variation of 47.8%. The air side had a pore mean centroid distance of 1.94 μm and a coefficient of variation of 38.6%, while the substrate side had a pore mean centroid distance of 2.71 μm and a coefficient of variation of 38.1%. The difference in the mean pore sizes of the air side and the substrate side was 82% based on the value for the air side. Both sides exhibited smooth, homogeneous porous films.

EXAMPLE 4

A polyimide porous film was obtained in the same manner as Example 2, except that DADE was used as the diamine component, DMAc was used as the solvent, 2-propanol was used as the non-solvent, the dope solution had a polyimide precursor content of 5.9 wt % and a mixed solvent content of 94.1 wt %, the dope mixed solvent had a composition with 58.8 wt % of the solvent and 41.2 wt % of the non-solvent, and the coagulating solution contained 83.3 wt % of the non-solvent and 16.7 wt % of the solvent.

The polyimide porous film thickness was 14μ, the porosity was 47%, the air side had a mean pore size of 0.67 μm and a coefficient of variation of 46.4%, and the substrate side had a mean pore size of 1.41 μm and a coefficient of variation of 30.4%. The air side had a pore mean centroid distance of 1.13 μm and a coefficient of variation of 35.3%, while the substrate side had a pore mean centroid distance of 3.83 μm and a coefficient of variation of 31.0%. The difference in the mean pore sizes of the air side and the substrate side was 110% based on the value for the air side. Both sides exhibited smooth, homogeneous porous films.

EXAMPLE 5

PPDA and s-BPDA were dissolved in NMP at a PPDA molar ratio of 0.994 with respect to s-BPDA and a total monomer component weight of 15 wt %, and polymerization was carried out for 6 hours at a temperature of 40° C. to obtain a polyimide precursor solution. 1-propanol was added to a portion of the polyimide precursor solution to prepare a solution wherein the polyimide precursor content was 9.7 wt %, the mixed solvent content was 90.3 wt %, the NMP content of the mixed solution was 59 wt % and the 1-propanol content thereof was 41 wt %, and the dope solution was cast onto a glass plate to a thickness of about 100 μm. The temperature was maintained thereafter at −10° C. A mixed solution containing 40 wt % of 1-propanol and 60 wt % of NMP kept at the same temperature was then applied onto the polyimide precursor liquid film with a glass rod to form a protective layer liquid film to a thickness of about 20 μm. It was then immersed for 15 minutes in a coagulating solution kept at a temperature of −10° C. and containing 66.7 wt % of 1-propanol and 33.3 wt % of NMP to obtain a polyimide precursor film which was homogeneous on both sides.

The polyimide precursor film was then washed with water at room temperature and released from the glass plate, after which it was dried at a temperature of 80° C. to obtain a polyimide precursor film. The polyimide precursor film was immediately stretched on a pin tenter, and then placed in a hot air drier at a temperature of 400° C. for 40 minutes of heat imidization to obtain a polyimide porous film.

Figure 5:
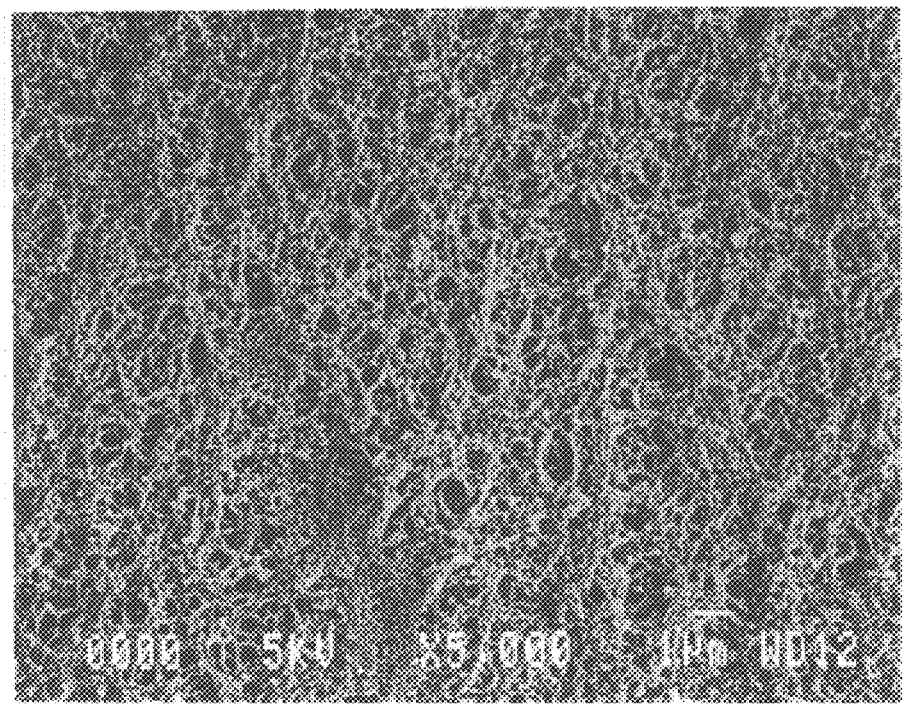
FIG. 5 is an electron microscope photograph showing the air side of the polyimide porous film obtained in Example 5 as an embodiment of the invention.
Figure 6:
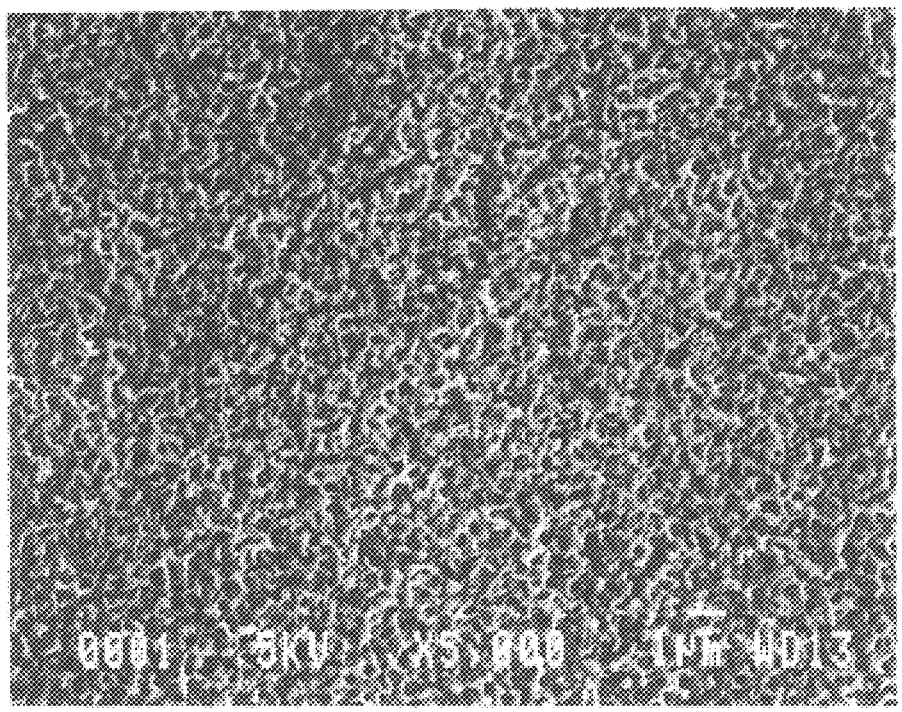
FIG. 6 is an electron microscope photograph showing the substrate side of the polyimide porous film obtained in Example 5.

The polyimide porous film thickness was 10 μm, the porosity was 65%, and the penetration strength was 65 g. As a result of observation with a scanning electron microscope, the air side had a mean pore size of 0.32 μm and a coefficient of variation of 43.3%, and the substrate side had a mean pore size of 0.22 μm and a coefficient of variation of 33.0%. The air side had a pore mean centroid distance of 0.88 μm and a coefficient of variation of 31.0%, while the substrate side had a pore mean centroid distance of 0.96 μm and a coefficient of variation of 43.8%. The difference in the mean pore sizes of the air side and the substrate side was 45% based on the value for the substrate side. Both sides exhibited homogeneous porous films with a smoothness evaluation of ○. Scanning electron microscope photographs of the air side and the substrate side of the film are shown in FIGS. 5 and 6.

COMPARATIVE EXAMPLE 2

A polyimide film was obtained in the same manner as Example 5, except that-the coagulating solution had a 1-propanol content of 100 wt %, and no protective layer was formed. The film thickness was 11 μm, the porosity was 60%, the mean pore size on the air side was 0.07 μm and the mean pore size on the substrate side was 0.55 μm.

The pore sizes on the air side and the substrate side differed by a significant 657% based on the substrate side pore size.

EXAMPLE 6

A polyimide porous film was obtained in the same manner as Example 5, except that the polymerization solvent was changed to DMAc, the solvent was changed to DMAc and the non-solvent to 2-propanol in the dope solution, protective layer solution and coagulating solution, and the protective layer had a non-solvent content of 34 wt % and a solvent content of 66 wt %.

The polyimide porous film thickness was 11 μm, the porosity was 73%, the gas permeability was 1000 sec/100 cm$^3$ and the penetration strength was 71 g. As a result of observation with a scanning electron microscope, the air side had a mean pore size of 0.54 μm and a coefficient of variation of 33.4%, and the substrate side had a mean pore size of 0.23 μm and a coefficient of variation of 34.2%. The air side had a pore mean centroid distance of 0.80 μm and a coefficient of variation of 25.0%, while the substrate side had a pore mean centroid distance of 0.90 μm and a coefficient of variation of 45.3%. The difference in the mean pore sizes of the air side and the substrate side was 135% based on the value for the substrate side. Both sides exhibited homogeneous porous films with a smoothness evaluation of ○.

EXAMPLE 7

A polyimide porous film was obtained in the same manner as Example 6, except that a solution containing 33 wt % of ethylene glycol and 67 wt % of DMAc was used as the protective layer, water was used as the coagulating solution, the temperature was 0° C. and the liquid film thickness was 500 μm.

The polyimide porous film thickness was 49 μm, the porosity was 69%, the gas permeability was 280 sec/100 cm$^3$ and the penetration strength was 162 g. As a result of observation with a scanning electron microscope, the air side had a mean pore size of 0.27 μm and a coefficient of variation of 34.2%, and the substrate side had a mean pore size of 0.24 μm and a coefficient of variation of 35.7%. The air side had a pore mean centroid distance of 0.49 μm and a coefficient of variation of 24.9%, while the substrate side had a pore mean centroid distance of 0.51 μm and a coefficient of variation of 20.9%. The difference in the mean pore sizes of the air side and the substrate side was 13% based on the value for the substrate side. Both sides exhibited homogeneous porous films with a smoothness evaluation of ○.

EXAMPLE 8

A polyimide porous film was obtained in the same manner as Example 7, except that the solvent of the dope solution contained 65 wt % of DMAc and 35 wt % of glycerin, and a solution containing 55 wt % of ethylene glycol and 45 wt % of DMAc was used as the protective layer.

The polyimide porous film thickness was 53 μm, the porosity was 67% and the penetration strength was 160 g. As a result of observation with a scanning electron microscope, the air side had a mean pore size of 1.4 μm and a coefficient of variation of 38.1%, and the substrate side had a mean pore size of 1.03 μm and a coefficient of variation of 23.4%. The air side had a pore mean centroid distance of 1.75 μm and a coefficient of variation of 3.0%, while the substrate side had a pore mean centroid distance of 1.39 μm and a coefficient of variation of 17.5%. The difference in the mean pore sizes of the air side and the substrate side was 36% based on the value for the substrate side. Both sides exhibited homogeneous porous films with a smoothness evaluation of ○.

The present invention provides polyimide porous films with a small difference between the pore sizes on the air side and substrate side and a uniform pore size and pore centroid distance.

Polyimide porous films obtained according to the invention have uniform liquid permeability on both sides, and may therefore be used in battery separators and micro-filters, and as starting materials for fuel cell carbonized films.

What we claim is:

1. A polyimide porous film obtained by drying and imidizing a polyimide precursor porous film which is substantially homogeneous on both sides, the polyimide porous film having pores on both sides wherein the pores all satisfy the following conditions 1) to 4):

1) The difference in the mean pore size of both sides is less than 200% based on the smaller average value of the mean pore size.
   2) The coefficient of variation for the pore size on each side is smaller than 70%.
   3) The coefficient of variation for the pore centroid distance on each side is smaller than 50%.
   4) The mean pore size on each side is 0.05–5 μm.

2. A polyimide porous film according to claim 1, wherein the polyimide precursor porous film is obtained by a method in which a polyimide precursor dope solution is cast and immersed in a coagulating solution to obtain a polyimide precursor porous film, wherein the following conditions for the composition of the dope solution and coagulating solution are satisfied:

(1) The polyimide precursor dope solution comprises 0.2–30 wt % of a polyimide precursor and 99.8–70 wt % of a mixture of a solvent and a non-solvent therefor.
   (2) The mixed solvent of the dope solution comprises 50–90 wt % of the solvent and 50–10 wt % of the non-solvent (for a total of 100 wt %),
   (3) The coagulating solution comprises 50–90 wt % of the non-solvent and 50–10 wt % of the non-solvent for the polyimide precursor (for a total of 100 wt %).
   (4) The compositional ratio of the solvent in the dope solution is greater than the compositional ratio of the solvent in the coagulating solution.

3. A polyimide porous film according to claim 1, wherein the polyimide precursor porous film is obtained by a method of casting the polyimide precursor dope onto a substrate, forming on said liquid film a protective layer comprising a mixture of a solvent and a non-solvent, with 30–70 wt % of a non-solvent and 70–30 wt % of a polar solvent for the polyimide precursor (for a total of 100 wt %), and then immersing it in a coagulating solution.

4. A polyimide porous film according to claim 3, wherein the polyimide precursor porous film is obtained using as the non-solvent component of the protective film an aliphatic monohydric alcohol of 3–5 carbons.

5. A polyimide porous film according to claim 3, wherein the polyimide precursor porous film is obtained using as the non-solvent component of the protective layer a polyhydroxy alcohol selected from among alkylene glycols, glycerin and polyalkylene glycols and their derivatives, and u-sing a coagulating solution with a composition comprising at least 60 wt % water.

6. A polyimide porous film according to claim 1, which is used for a battery separator or micro-filter.

* * * * *